United States Patent
Bogart (10) Patent No.: US 10,258,019 B1
(45) Date of Patent: Apr. 16, 2019

(54) QUICK SIFTING DOG PROOF LITTER DEVICE

(71) Applicant: Tamara Lynn Bogart, Brandon, FL (US)

(72) Inventor: Tamara Lynn Bogart, Brandon, FL (US)

( * ) Notice: Subject to any disclaimer, the term of this patent is extended or adjusted under 35 U.S.C. 154(b) by 0 days.

(21) Appl. No.: 15/729,974

(22) Filed: Oct. 11, 2017

Related U.S. Application Data (60) Provisional application No. 62/406,512, filed on Oct. 11, 2016.

(51) Int. Cl.
*A01K 1/01* (2006.01)

(52) U.S. Cl.
CPC ............ *A01K 1/011* (2013.01); *A01K 1/0114* (2013.01)

(58) Field of Classification Search
CPC ........................... A01K 1/0114; A01K 1/0107
USPC ....... 119/165, 166, 161, 168, 170, 163, 462, 119/182; D30/161
See application file for complete search history.

(56) References Cited

U.S. PATENT DOCUMENTS

| | | | | |
|---|---|---|---|---|
| 3,100,474 A * | 8/1963 | Schneider | ............ | A01K 1/0114 119/166 |
| 5,394,835 A * | 3/1995 | Gatta | ................... | A01K 1/0107 119/165 |
| 5,713,302 A * | 2/1998 | Walter | ................. | A01K 1/0107 119/165 |
| 5,749,317 A * | 5/1998 | Richey | ................. | A01K 1/0107 119/165 |
| 5,983,831 A * | 11/1999 | Thompson | ........... | A01K 1/0114 119/161 |
| 6,286,457 B1 * | 9/2001 | Sugahara | ............. | A01K 1/0114 119/161 |
| D473,351 S * | 4/2003 | Critchley | ..................... | D30/111 |
| 7,673,585 B1 * | 3/2010 | Emmi | .................. | A01K 1/0107 119/165 |
| 8,230,810 B2 * | 7/2012 | Mynatt | ................ | A01K 1/0114 119/166 |
| 8,607,738 B2 * | 12/2013 | Wilson | ................. | A01K 1/0107 119/161 |
| 8,881,680 B1 * | 11/2014 | Woody | ................. | A01K 1/0114 119/165 |
| 9,027,761 B2 * | 5/2015 | Wyrostek | ............. | A01K 1/0114 119/166 |

* cited by examiner

*Primary Examiner* — Yvonne R Abbott-Lewis

(57) ABSTRACT

A litter box apparatus housing top container used for litter area. Litter and waste are displaced by simple movement outward of top container, waste is retained by sifting surface of middle container, clean litter falls to bottom container. Cover is transparent, peel and stick movable designs are used to customize to the individual cat and owner's needs. Optional side or back hinge guides cover to closure. Cat enters through cover, walks on a shelf removing litter from paws upon exit. A partial partition extends time cat walks on shelf and will prevent dogs who seek to consume waste from accessing litter area. With optional use of stick-on child proof drawer locks can prevent young children from accessing litter and waste. Motion sensor timer signifies if enough time elapsed for waste to dry before sifting. The litter box apparatus provides a clean, customized litter box experience for both pet and owner.

3 Claims, 7 Drawing Sheets

QUICK SIFTING DOG PROOF LITTER DEVICE

CROSS-REFERENCE TO RELATED APPLICATION

This application claims the benefit of provisional patent application No. 62/406,512 filed Oct. 11, 2016 under customer number 92347.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING

Not Applicable

BACKGROUND OF THE INVENTION

The use of cat litter boxes with commercially available clumping litter is well known in the prior art. Currently there are many configurations of litter boxes and many solutions for cleaning a litter box.

U.S. Pat. Nos. 5,676,090, 5,679,026 and application 2013/0133583 address litter tracking with no solution for hand scooping waste.

U.S. Pat. No. 9,027,761 and application 2009/0013935 involve separating waste from the clean litter by instructing the user to lift the entire load of waste and litter into a separator or changing the position of drawers each time litter is sifted and disposing of the waste right away as in U.S. Pat. Nos. 5,749,317 and 5,983,831. These patents also call for two litter boxes that will be used directly by the cat creating multiple surfaces that will have to be cleaned as such.

U.S. Pat. No. 6,997,137 teaches in one embodiment to dump all the litter and waste to a receptacle below in which a sifting bag is used to separate the waste from unused litter for disposal. Sifting bags trap clean unused litter as well as waste which is disposed of causing impact to the environment. This patent requires lifting the litter pan, heavy with both waste and litter, up to a dump position. The other embodiment requires the user to use a spatula or scoop to push waste through a flap to the receptacle below and only use the dump function when it is desired to clean the entire litter pan.

U.S. Pat. No. 8,230,810 includes two litter boxes used by the cat and will have to be cleaned as such. Also, only the bottom surface of the drawers is removed so the user will have to use a scoop or spatula to force any clumps stuck to the side walls to fall into the container below.

There are many litter boxes on the market that teach using trays that nest together with the top tray to be used by the cat with a bottom surface with openings to sift the litter. To sift the litter, the tray is lifted to allow the clean litter to fall to the solid tray below. This fails because cat waste gets stuck in the screen as wet waste material makes its way through the litter and reaches the sifting screen. This causes more cleaning of the multiple litter trays and difficulty cleaning the waste out from between the openings in the screen. While hand scooping litter or using the sifting litter boxes available there is spillage of litter on the floor and feet of the owner unless great care is given to the task. The prior art does not provide a solution for multiple problems associated with a litter box like preventing dogs who instinctively seek to consume cat waste and young children who put things in their mouth, from accessing the litter and waste. The available litter boxes do not take into consideration the individual cat's fear of dark spaces and many have non-transparent lids. They also do not provide a solution for the owner's need for the device to be attractive and blend with their taste in home décor and if they do, they are made of wood or other material that is damaged by contact with animal waste. There are open litter boxes that allow litter to be tracked outside the litter box throughout the home and covered litter boxes that require removal of the lid and set aside on the floor while hand scooping waste. These lids are difficult to seat back in place. Litter boxes accumulate waste stuck to the inside surfaces and this especially happens when the cat has recently used the litter box unbeknownst to the owner and they attempt to sift the litter before the waste has had time to dry. This contributes to the odor associated with litter boxes. An electric litter box has a motion sensor to ensure the rake is not activated while the cat is in the litter but electric litter boxes as well as the litter used in them can be expensive. Further the metal rakes become dirty with stuck on waste and are awkward and time consuming to clean.

There is a need therefore in the market for a litter box apparatus that provides a solution for a multitude of issues associated with a litter box instead of one issue.

BRIEF SUMMARY OF THE INVENTION

It would be advantageous to have an apparatus that creates a clean litter box experience for both pet and owner that solves the multitude of problems associated with the litter box. The invention would preferably be made of plastic or other material that would not be damaged by contact with pet waste or cleaning products.

The invention will consist of an outer container that would house three containers for quickly and efficiently cleaning the litter. A top positioned inner container with sides, bottom and front with no back surface but in combination with the back surface of the outer container would serve as the litter area of the apparatus. The top container is moved outward against a second, stationary inner front surface shaped to come in contact with the bottom and side surfaces. The outward movement of the top container displaces all the litter and waste to a second container positioned below the top container. The second middle container has sides, front and back surface and a bottom surface that has openings sized for sifting litter. With slight movement of the middle container the clean unused litter falls to a third container in the bottom position. The bottom container can be removed and used to pour the unused litter back in the top container for reuse. This eliminates hand scooping of the waste and results in quick, efficient sifting and cleaning of the litter. There would be less waste of unused litter which would benefit the environment.

A preferably battery-operated motion sensor would count the time since the litter area was last used by the cat and would allow the owner to wait the appropriate time needed for proper drying of waste into hard clumps before attempting to sift the litter thus reducing the chance of waste sticking to the top container litter area or the sifting surface in the second container.

When enough waste is collected in the second container, the third container can be pulled out and lined with a trash bag. The waste contents of the second drawer can be dumped into the trash bag for disposal without any litter escaping to the floor or the owner's feet.

The cover of the apparatus would preferably be transparent allowing peel and stick movable designs to be applied to customize to the individual cat's level of fear of dark spaces. This would help eliminate cats soiling outside the litter box. The use of peel and stick designs would also be used to satisfy the owner's need for the entire litter box to blend with the owner's taste in home décor as well as block the view of the waste. The lower portion would preferably be non-transparent which would block the view of most of the waste and litter.

The cover has an entrance where the cat steps on a shelf with openings in the surface to remove litter from the cat's paws upon exit with the litter falling back into the top container for reuse resulting in less waste. The shelf is positioned across the top container from front to back in the embodiment shown. The cover includes an opening for a filter to provide ventilation and prevent potential odor.

There is a hinge provided to be placed on one side or the back so the cover can be lifted to a side or the back depending on the space available. The cover does not need to be completely removed to pour clean litter back in the top container and will come back to rest naturally in the closed position when done. There is a latch on each side that secures the outer container to the cover.

A partial partition between the cat entrance and the litter area in combination with the shelf would block a dog from accessing the litter. It would also force the cat to turn out of the litter area and maximize the time the cat's paws contact the shelf for removal of litter. This would prevent tracking of litter outside the box. With the optional use of temporary stick-on child proof drawer locks, young children could be prevented from accessing the litter and waste. This would allow the owner to place the litter box apparatus where it can be readily used by the cat in a space shared by other pets and young children.

The invention provides one litter area in the top container that is used by the cat reducing the number of surfaces to clean and allowing the owner the opportunity to inspect and spot clean the surface each time the litter is sifted. This reduces the odor associated with a litter box. The disposal of waste is only needed when enough has been collected. There would be less chance of spilling litter while cleaning the litter box because of the unique arrangement of the components where the litter and waste is sifted inside the apparatus. The invention advantageously provides a solution to the multitude of problems associated with a litter box and fulfills the need for a clean, customized litter box experience for both the pet and owner.

The invention will now be described more fully hereinafter with reference to the accompanying drawings, which are intended to be read in conjunction with both this summary, the detailed description and any preferred and/or particular embodiments specifically discussed or otherwise disclosed. The invention may, however, be embodied in many different forms and should not be construed as limited to the embodiments set forth herein; rather, these embodiments are provided by way of illustration only and so that the disclosure will be thorough, complete and will fully convey the full scope of the invention to those skilled in the art.

DETAILED DESCRIPTION OF THE INVENTION

Following are more detailed descriptions of various concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided for illustrative purposes.

The invention is directed to be a litter box with container system that does not require hand scooping of waste but provides for quick, efficient cleaning and sifting of litter with waste only having to be disposed when enough has been collected. It eliminates litter being tracked outside the litter box, prevents dogs, and with the use of stick-on child proof drawer locks could prevent young children, from accessing the litter and waste. It is customizable to the cat's level of fear of dark spaces and the owner's preference for an attractive device. It provides a preferably battery-operated motion sensor with timer to count the time since the litter area was last used to prevent premature sifting before the waste is dried and provides daily opportunities to inspect and spot clean the litter box surface to avoid odor build up. It would help cats with inappropriate soiling based on fear of dark spaces and provide the owner with a more attractive appearance.

Referring to the figures, it should be noted first that peel and stick movable designs could be applied anywhere to the visible outer surface of the device for which there would be an infinite number of possibilities to satisfy the owner's need for an attractive device. This should be taken into consideration when reviewing each of the drawings and the example shown is to illustrate how these designs would help the individual cat's fear of dark spaces.

Figure 1:
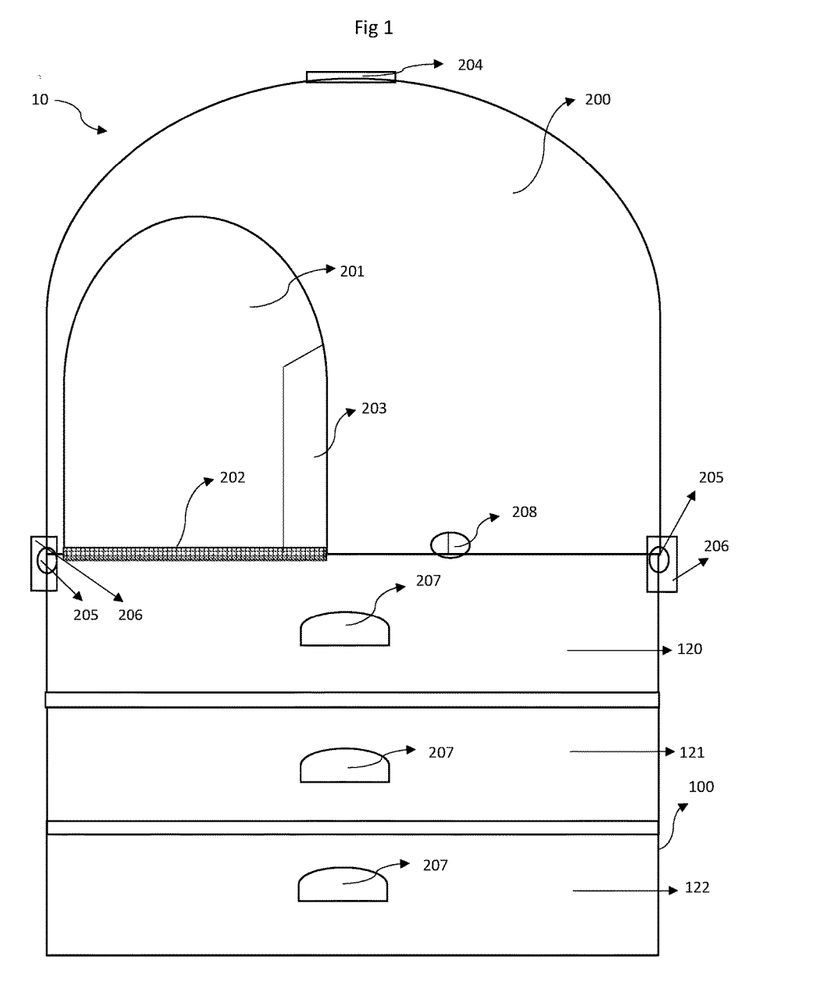
FIG. 1 shows the front view of the device.

FIG. 1 shows a front view of the apparatus, generally referred to as device 10. The device 10 is comprised of outer container 100 which houses three removable containers referred to as top container 120, middle container 121 and bottom container 122. There is a cover 200 which includes an opening for cat entry 201. Immediately upon entry into the interior the cat steps on a shelf 202 that rests on the top surface of the outer container 100 and extends from front to back of the outer container 100 with apertures to allow for the removal of litter from the cat's paws while exiting, whereby tracked litter is deposited back into the top container 120. There is a vertical partition positioned at the opening of the entrance 201 starting at the level of the shelf 202 and extending partially from front to back of the outer container 100 and extends upward from the shelf 202 high enough to block a dog from accessing the litter. A hinge 205 can be utilized on one of the sides or back of the apparatus allowing the cover 200 to be lifted to one side or the back but not completely removed. There is a latch 206 on the right and left side to secure the cover in place and assist with preventing dogs from accessing the litter. With the optional use of stick-on child proof drawer locks young children could also be prevented from accessing the litter and waste.

The top container 120, middle container 121, and bottom container 122 each have a handle 207 to assist with movement of the containers. The cover 200 includes a filter opening 204 for ventilation and to insert a preferably carbon-based filter. A motion sensor timer 208 is provided for timing the last use by the cat to allow proper drying time before sifting the litter.

Figure 2:
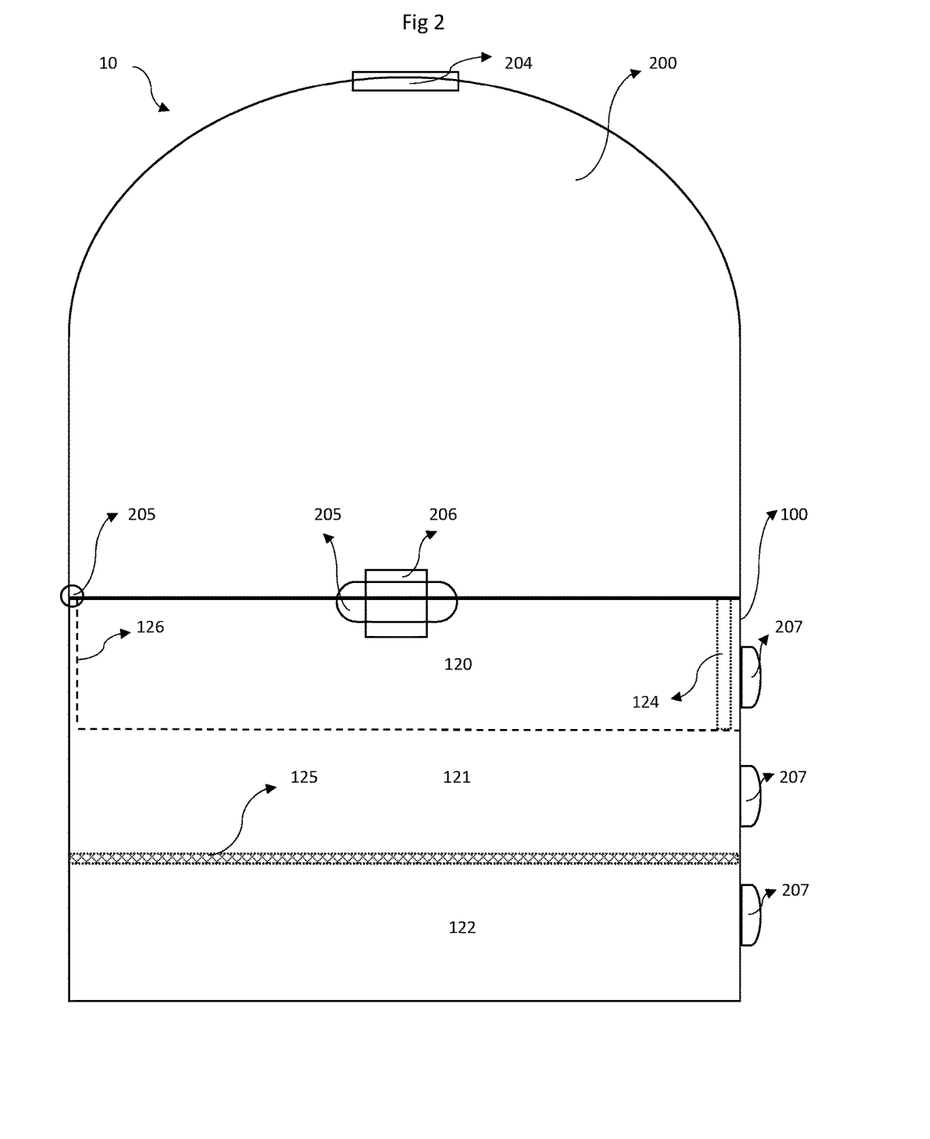
FIG. 2 shows the left view of the device with internal parts.

FIG. 2 shows a left side view with some internal parts to understand the apparatus further. The top container 120 is configured with no back surface 126 and therefore in communication with a second, stationary internal front wall 124 wherein movement of the top container 120 out from the outer container 100 using handle 207 will displace all the litter and waste to the middle container 121 below. The middle container 121 has a bottom surface 125, wherein the surface is sized to sift litter. Slight movement of the middle container 121 using handle 207 will sift litter with the waste retained on the bottom surface 125 and unused clean litter falling below to the bottom container 122. The clean unused litter received in the bottom container 122 can then be poured back into the top container 120 by removal of bottom container 122. The hinge 205 is used to facilitate opening the cover 200 but not having to completely remove cover 200. The latch 206 will secure cover 200 to the outer container 100 further assisting with the prevention of dogs or young children from opening the cover 200 and accessing litter or waste.

Figure 3:
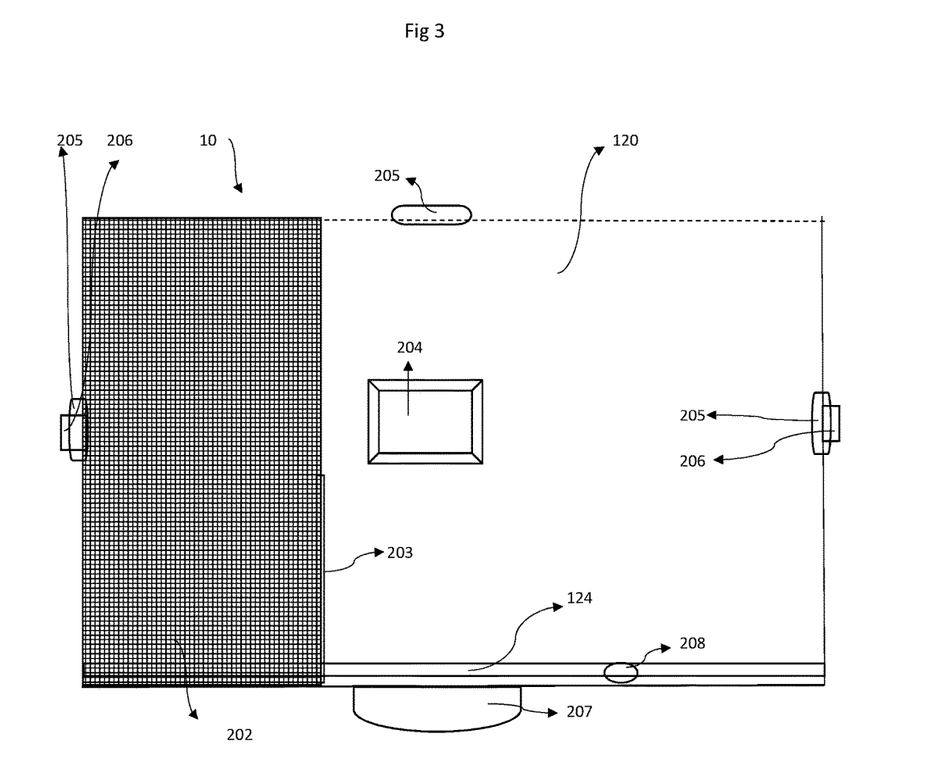
FIG. 3 shows the top view of the device.

FIG. 3 is a top view of the device 10 showing top container 120, the shelf 202 that the cat walks on to remove litter from the cat's paws upon exit, the partial partition 203 to prevent dogs from accessing the litter, the second, stationary inner front wall 124, filter opening 204 in the cover 200 (cover itself not visible in this view). The side latches 206, optional hinge positions 205, and motion sensor timer 208 are shown to help understand the apparatus further.

Figure 4:
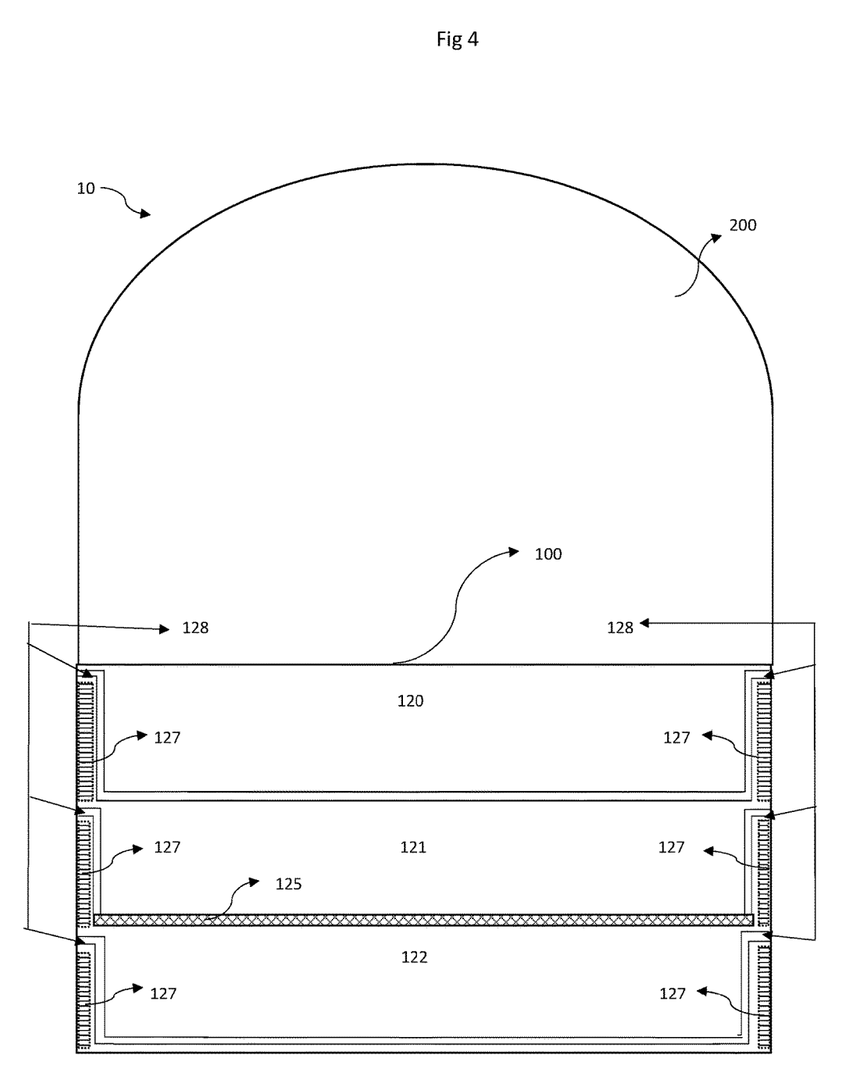
FIG. 4 shows the front view of the device with internal parts.

FIG. 4 is a front view with internal parts of the device 10 shown to further understand this embodiment. The top container 120, middle container 121 with bottom surface 125, and bottom container 122 with the outer container 100 having internal side support structures 127 that begin at the front of outer container 100 and continue to the back of the outer container 100. There is a space 128 between each internal side support structure 127 to allow for the containers 120, 121 and 122 to slide in from the front of the outer container 100. Those skilled in the art could conceive of many other possible embodiments to provide the same purposes and this embodiment is shown for illustration only.

Figure 5:
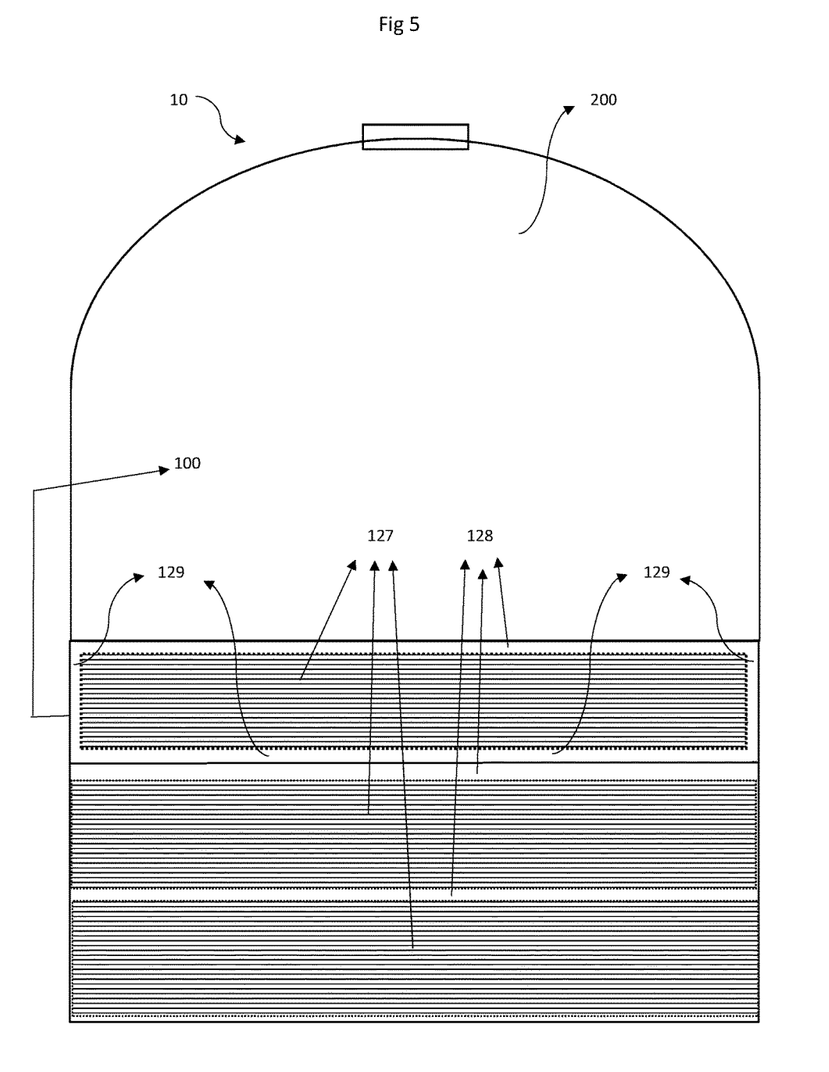
FIG. 5 shows the back view of the device with internal parts.

FIG. 5 is a back view of the device 10 with some internal parts shown to further understand the apparatus. The internal support structures 127 continue across the back of the outer container 100 leaving a space 129 for each side and bottom back surfaces of top container 120 to slide in and space 128 for the edges of middle container 121 and bottom container 122 to slide in. Those skilled in the art could conceive of many other possible embodiments to provide the same purposes and this embodiment is shown for illustration only.

Figure 6:
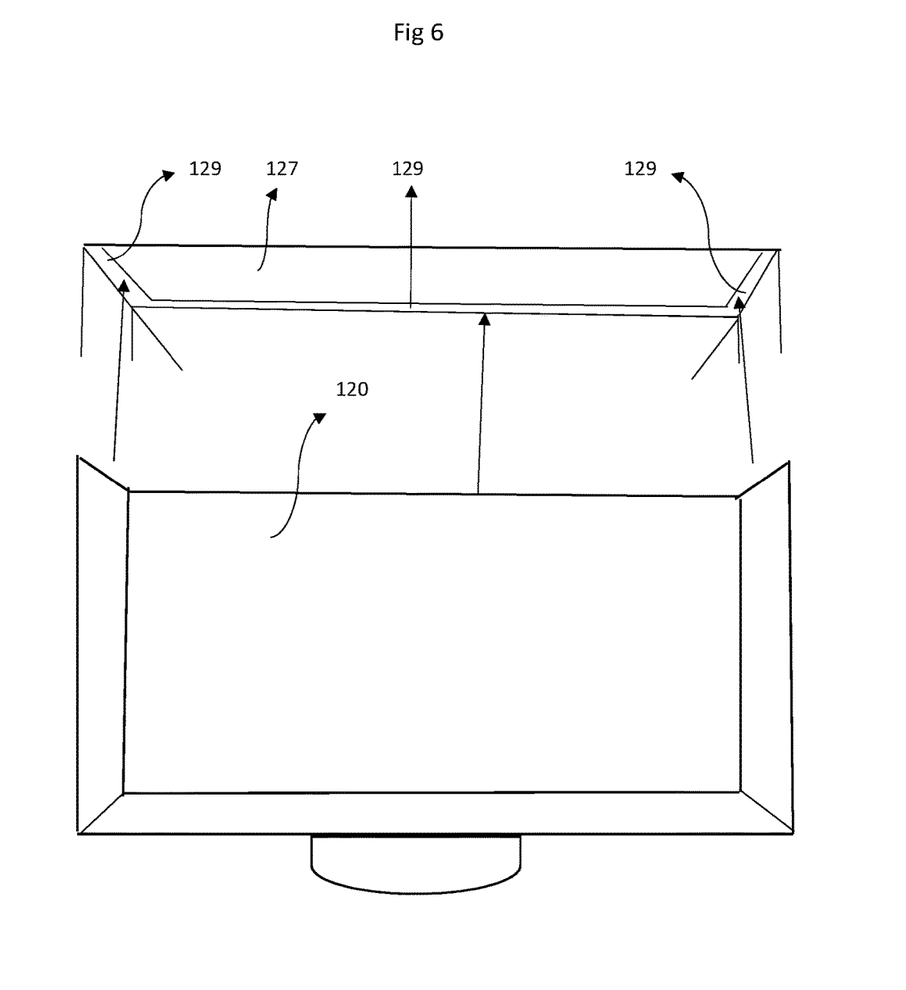
FIG. 6 shows a top view of the device with movement.

FIG. 6 is a top view of top container 120 showing the absence of back wall surface and how top container 120 would slide into the space 129. The arrows (not numbered) illustrates the movement of top container 120 into slots 129 formed by the internal support structures 127.

Figure 7:
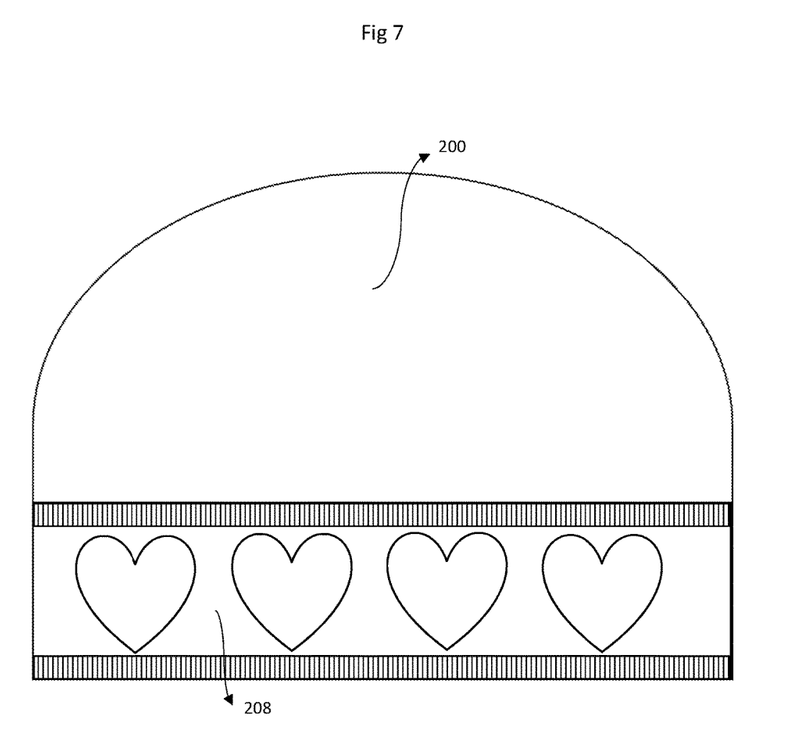
FIG. 7 is a view of the cover with example design.

FIG. 7 is a view of the cover 200 with an example peel and stick removable design 208 that would block the view of waste from the side while allowing light to flow through the cover 200. This would be adjustable depending on the cat's fear of dark spaces. The designs would be placed around the perimeter of the cover and would consist of adjustable heights and designs.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by this disclosure. It is intended that the scope of the invention should be determined by proper interpretation and construction of the claims and their legal equivalents, as understood by those of skill in the art relying upon the disclosure in this specification and the attached drawings.

The invention claimed is:

1. A litter box apparatus, comprising: an outer container with an opening shaped to receive a top position container having bottom and side surfaces, and said top position container has no back surface, used in combination with said outer container as a litter box, and by outward movement of said top position container through said opening, constitute a means for displacement of the litter and waste to a middle position container having a bottom surface that includes openings sized to sift litter, and said middle position container receives the litter and waste from said top position container, and a bottom position container to receive clean unused litter that falls through said openings in said bottom surface of middle position container whereby litter box is quickly and efficiently cleaned.

2. The litter box apparatus of claim 1 further including: a cover with an opening for entrance where the pet steps on a shelf positioned over the litter box with apertures sized to remove litter from the pet's paws upon exit and a barrier partition is situated between said shelf and litter area starting at the entrance and extending partially toward the back of said shelf, and extending upward toward the top of said cover whereby dogs are prevented from accessing litter and waste, and litter removed from the pet's paws falls back into the litter box for reuse.

3. The litter box apparatus of claim 2 further including: peel and stick movable designs are provided to be placed on the outer surface, motion sensor timer signifies if enough time has elapsed for waste to dry before sifting litter and a hinge is situated on the back or a side, whereby said cover naturally comes back to rest in the original position as the user closes.

* * * * *